United States Patent Office 3,142,077
Patented July 28, 1964

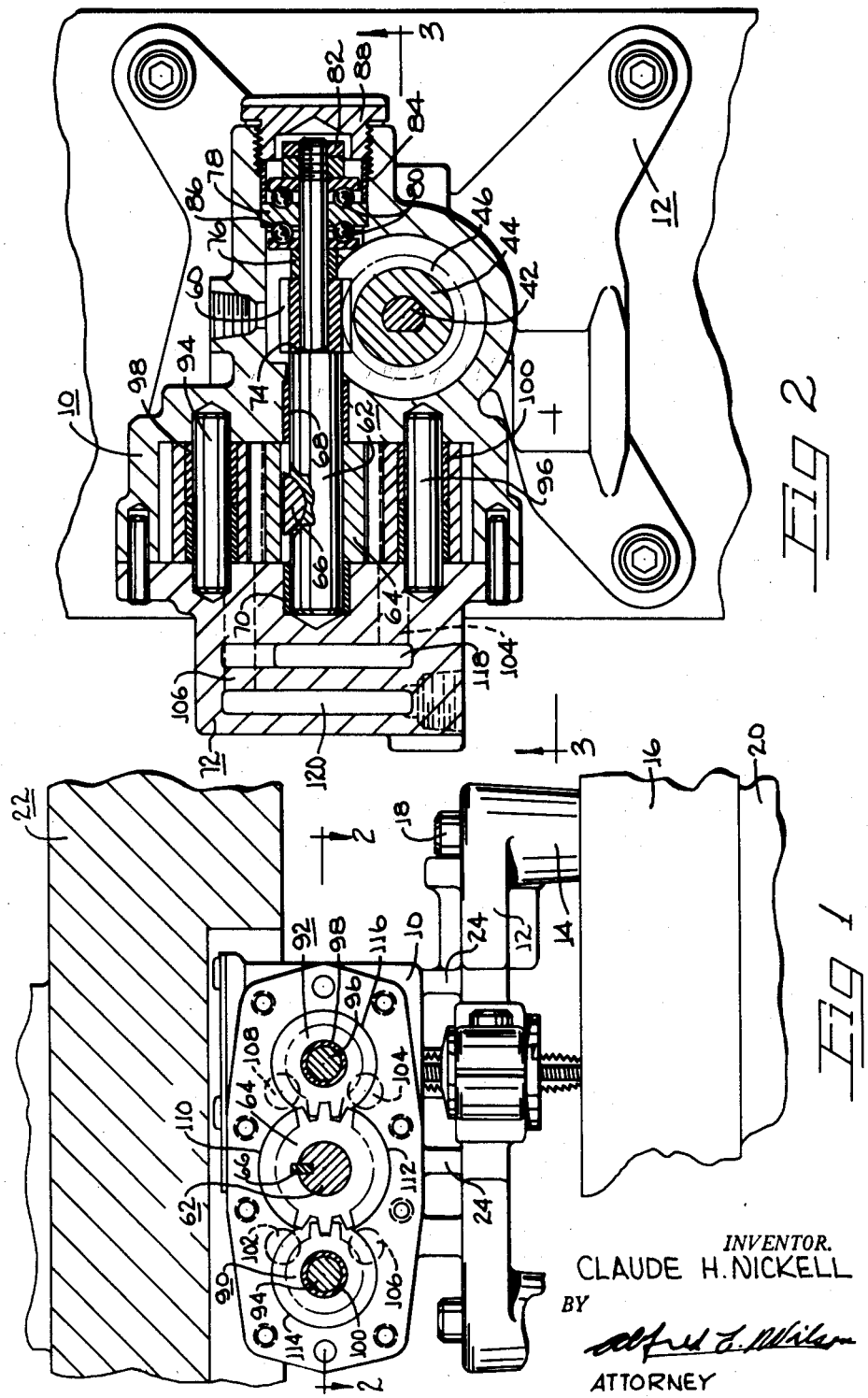

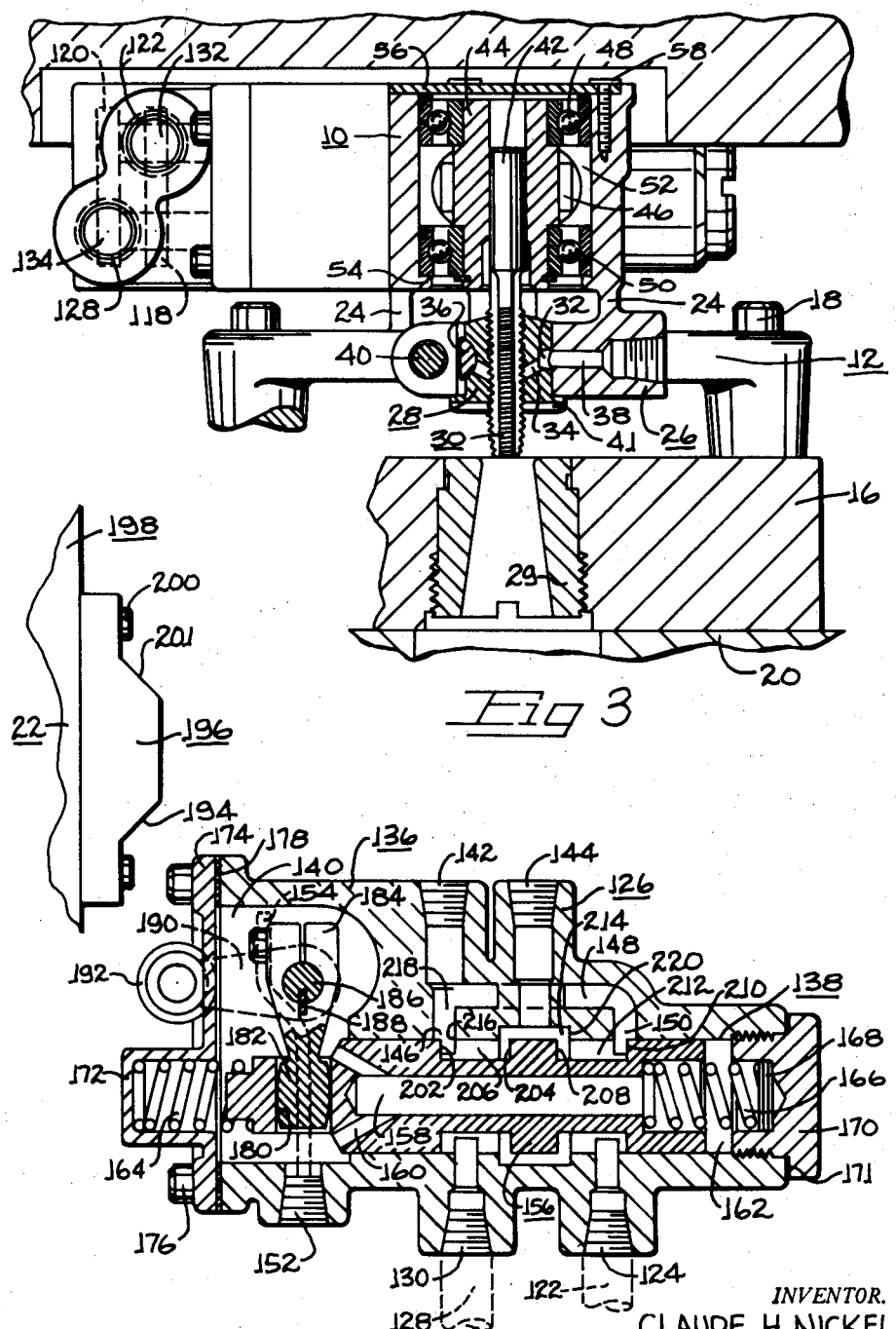

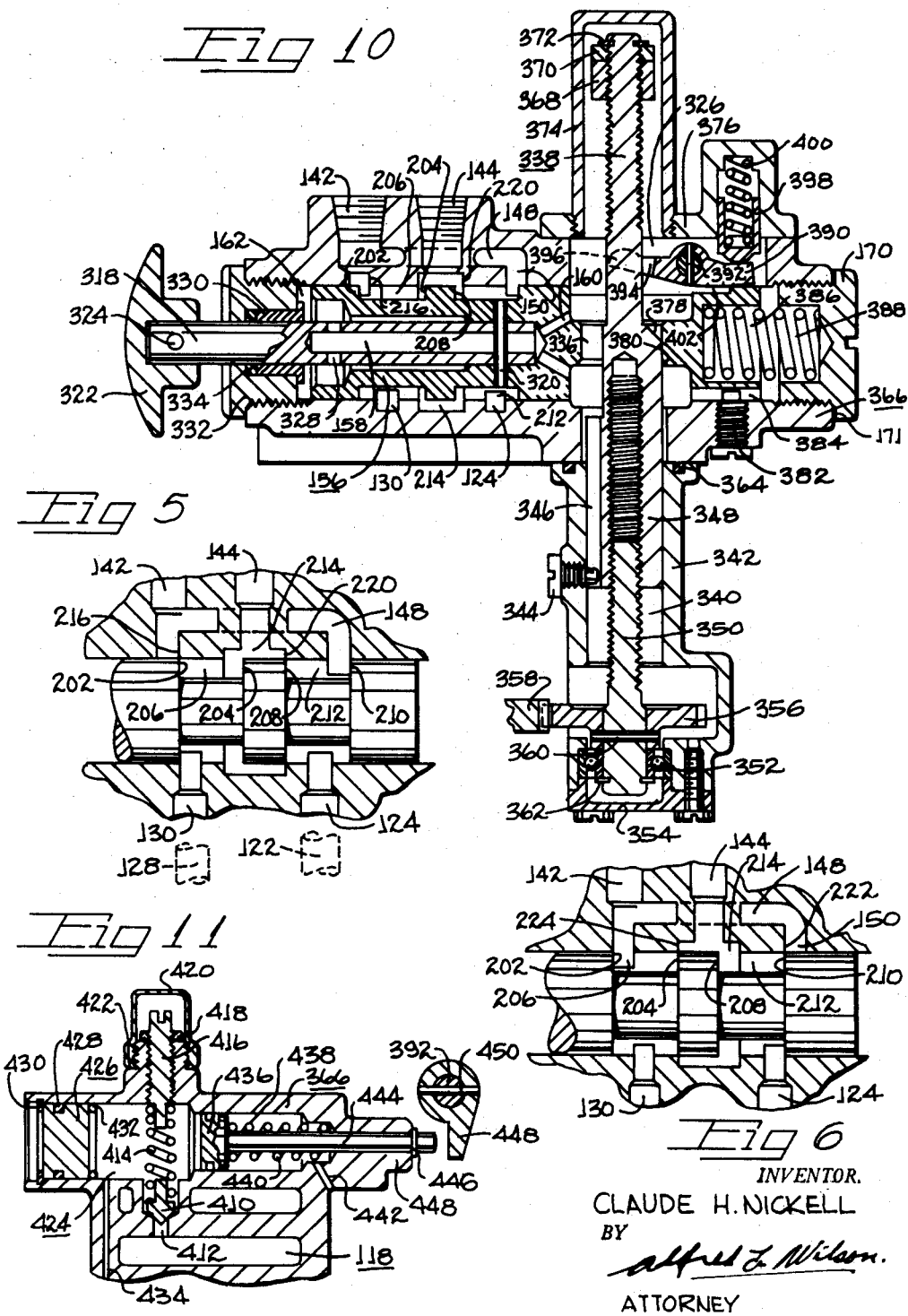

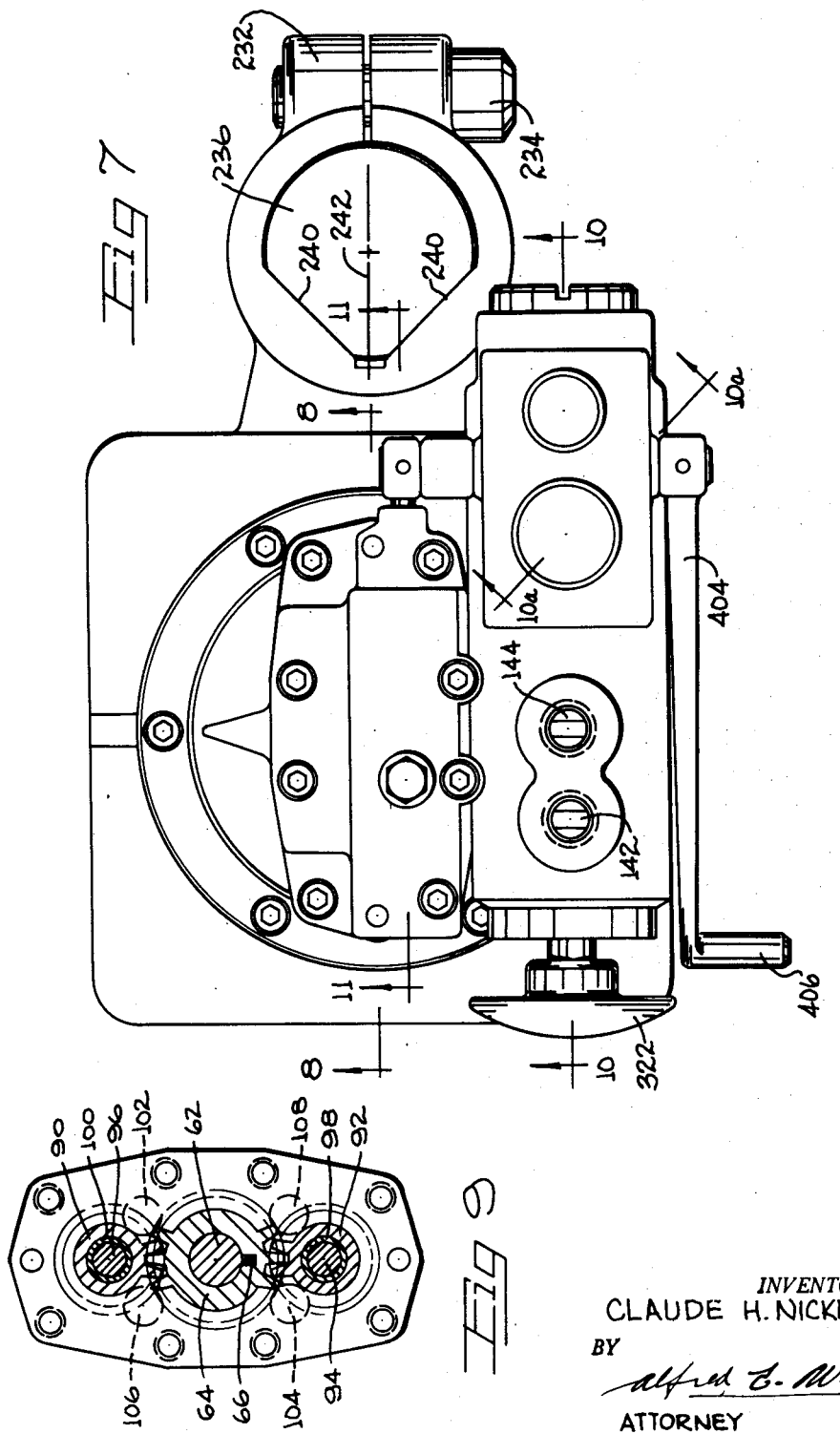

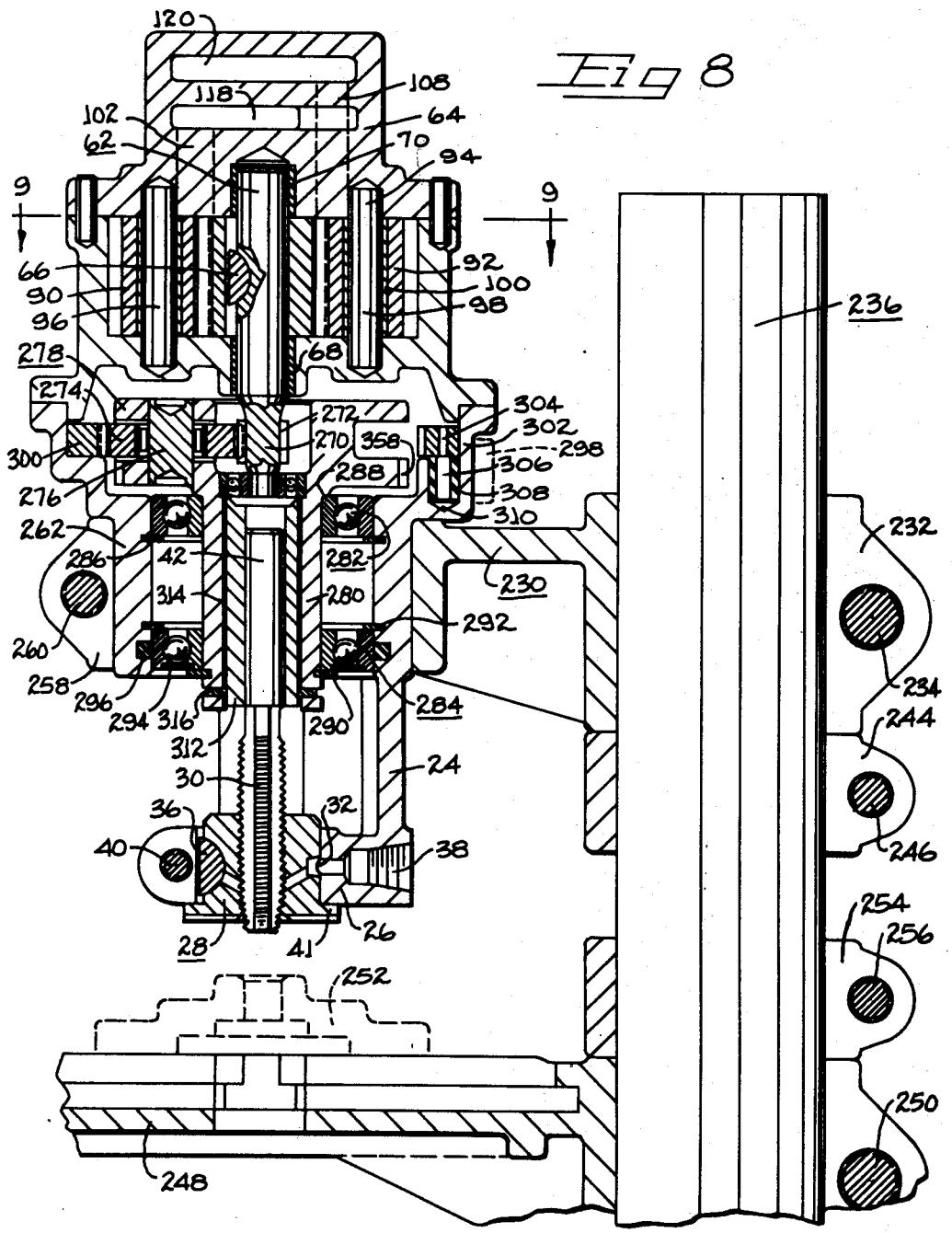

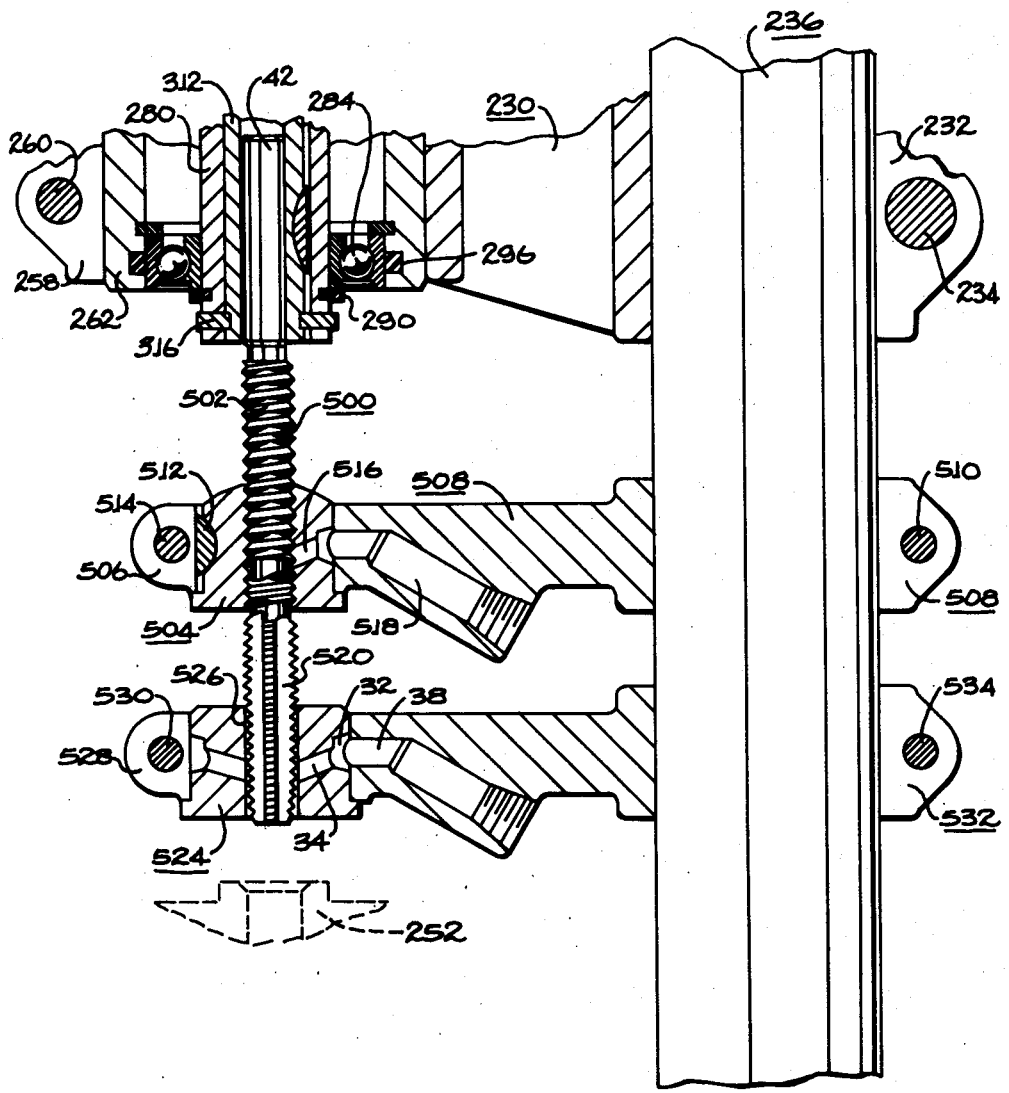

3,142,077
SCREW THREADING APPARATUS WITH MECHANICALLY ACTUATED VALVE FOR CONTROLLING REVERSIBLE FLUID MOTOR
Claude H. Nickell, 17809 Oakwood Ave., Dearborn, Mich., assignor of fifty percent to Alfred E. Wilson, Dearborn, Mich.
Filed Feb. 18, 1959, Ser. No. 794,124
5 Claims. (Cl. 10—129)

This invention relates to thread tapping or grooved lead forming devices and more particularly to an improved device wherein a driving sleeve is rotated relative to a nonrotatable guiding member in a novel and improved manner.

The formation of threads or grooved leads on stamped, rolled, forged or cast members has heretofore required a separate operation which increased the cost of fabricating parts. The devices heretofore used in the formation of threads or grooved leads have necessitated the use of a tapping attachment in conjunction with a drill press or other similar device. Considerable space was thus required and the formation of threads or leads necessitated the use of additional labor directed specifically to the formation of the necessary threads or leads.

I have devised an improved machine capable of forming threads or grooved leads of all types in any desired members, and wherein a self-contained unit may be associated with any type of machine operation such, for example as with a drill press, punch press or any material-forming tool having a reciprocating part. In my improved device the movement of the reciprocating part is utilized to start and stop the thread or lead tapping device, but the operation of the lead forming or tapping device is not dependent on the reciprocation of the relatively movable parts.

An object of my invention is therefore to provide an improved tapping or lead forming device which is of the self-contained type, and which may be operated in any desired manner as by movement of a reciprocating member relative to another member, or by manual or electrically actuated devices controlled in any desired manner as by tapes, punched cards or other control devices.

A further object of my invention resides in the provision of an improved lead or thread-forming machine which may be actuated by the indexing movement to a different position of a member being worked upon or by the movement of a fixture relative to the member being worked upon or to a different station.

Another object of my invention is to provide an improved tapping device having a stationary lead control guide and a rotatable member driven by gearing controlled by a fluid pressure actuated motor to drive the tap, an improved valve being employed to control the motor to drive the tap in opposite directions.

A further object of my invention is to provide an improved tapping or lead forming machine which automatically functions to tap a member, withdraw the tap, and stop the rotation of the tap when it is removed from the member being threaded.

Still another object of my invention is to provide a fully automated tap thread or lead-forming device wherein upon actuation of a member controlling a start cycle the tap is automatically threaded to the desired depth, is automatically retracted from the tapped member and is automatically shut off upon withdrawal of the tap from the member being operated upon.

A further object of my invention is to provide a fluid pressure operated tapping device for forming a thread or a lead having a fluid pressure responsive overload control device to automatically shut off the device in the event that the torque required to drive the device exceeds a predetermined value.

Another object is to provide an automatic fluid pressure responsive control for stopping a thread or groove-forming tapping operation in the event that the tap becomes dull to such a point that the torque required to drive the tap increases to a predetermined value.

Yet a further object of my invention resides in the provision of an improved thread or groove tapping device which may be operated by any convenient source of fluid pressure associated with a machine tool, or a separate self-contained fluid pressure source may be employed to drive my improved tapping device.

Another object of my invention is to provide an improved fluid pressure actuated motor which can be manufactured economically, and which provides dual balanced fluid pressure inlets spaced on opposite sides of a driven member to provide a balanced structure free from the vibrational stresses to which such motors are subjected.

Another object is to provide a low-cost fluid pressure actuated motor having a central output shaft driven by fluid pressure introduced at and discharged from diametrically spaced dual inlet and outlet control ports positioned at spaced points of a main gear interposed between spaced idler gears meshing with the main gear in such a manner that the main gear is driven hydraulically and mechanically to provide a balanced driving motor which may be readily reversed by reversing the flow of pressurized fluid to the control ports.

Another object is to provide an improved fluid motor having three gears wherein a central gear of larger diameter meshes with spaced side gears, four fluid passages grouped as two pairs symmetrically spaced pairs being provided to selectively function as inlet and outlet passages controlling the direction of rotation of the motor.

Yet a further object of my invention is to provide an improved fluid pressure actuated motor wherein the circumferential length of the sealed areas between symmetrically spaced pairs of fluid passages which selectively function as fluid outlet and inlet ports is substantially balanced, the motor being readily reversible by reversing the direction of fluid flow through the pairs of fluid passages.

A further object of my invention is to provide an improved valve having a spool valve which requires no packing, and wherein one of a pair of spaced ports may be subjected to fluid pressure and the other port of the pair may be vented when the valve is moved in one direction, and the ports may be oppositely pressurized and vented when the valve is moved in the other direction.

Still a further object of my invention resides in the positioning of a spool-type valve between a source of fluid pressure and a pair of spaced ports connected to a device to be actuated and wherein both ports are vented when the valve is in a neutral position and the ports are selectively pressurized and vented when the valve is moved in opposite directions from the neutral position.

Another object of my invention is to provide an improved hollow spool valve slidably mounted in a cylinder interposed between spaced vented chambers supplied by fluid flowing through the valve to exert equal pressures on opposite ends of the valve to prohibit free travel of the valve in the cylinder.

Yet a further object of my invention is to provide an automatically operable device for programming a function to be performed, such for example as a tapping operation followed by a withdrawal of the tap and the return of the device to a neutral or inoperative position.

Another object of my invention is to provide an improved valve having a pressure relief valve in a drain passage communicating with the space on opposite ends of a spool valve thereby eliminating the need for providing seals between the spool valve and the cylindrical chamber, the pressure relief valve being set at a pressure slightly below the inlet pressure of fluid controlled by the valve to function as a safety factor to prevent damage to the mechanism in the event that an overload condition is encountered.

A further object is to provide an improved lead screw and tap.

Other objects of this invention will appear in the following description and appended claims, reference being had to the accompanying drawings forming a part of this specification wherein like reference characters designate corresponding parts in the several views.

In the drawings:

FIGURE 1 is a side elevational view, partly in section illustrating one embodiment of my invention applied to a thread or lead tapping device;

FIG. 2 is a sectional view taken substantially on the line 2—2 of FIG. 1, looking in the direction of the arrows;

FIG. 3 is a sectional view taken substantially on the line 3—3 of FIG. 2 looking in the direction of the arrows;

FIG. 4 is a sectional view of the valve mechanism for controlling the thread or lead tapping unit, the valve being shown in a neutral position;

FIGS. 5 and 6 are fragmentary sectional views similar to a portion of the device illustrated in FIG. 4 and illustrating the fluid passages when the control valve is moved to the forward and reverse drive positions respectively;

FIG. 7 is a plan view of a modified form of my invention as applied to a device for programming a function to be performed, such for example as a thread or lead tapping operation followed by a withdrawal of the tap and a return to a neutral or inoperative position;

FIG. 8 is a sectional view taken substantially on the line 8—8 of FIG. 7, looking in the direction of the arrows;

FIG. 9 is a sectional view taken substantially on the line 9—9 of FIG. 8, looking in the direction of the arrows;

FIG. 10 is a sectional view taken substantially on the line 10—10 of FIG. 7, the lower portion of the device being taken on the angled line 10a—10a of FIG. 7 also looking in the direction of the arrows;

FIG. 11 is a sectional view taken substantially on the line 11—11 of FIG. 7 looking in the direction of the arrows; and FIG. 12 is a fragmentary side elevational view illustrating a modified form of my invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to the embodiment of my invention illustrated in FIGS. 1 to 6, it will be noted that a main body 10 is mounted on a spider 12 having bosses 14 adapted for example to be mounted on a lower die member 16 and to be secured thereto as by screws 18. The lower die member 16 is secured to a press bed 20 in a known manner, a reciprocating ram 22 being movable vertically relative to the lower die member 16 in a conventional manner to perform a shaping or other operation on a device operatively associated with the die member 16.

My improved device for tapping leads or threads may be controlled by relative movement between the die and the reciprocating ram 22. It will of course be apparent that the die member 16 and the reciprocating ram 22 may be part of a progressive die member, or it may be a movable portion of a drill press or work table. My improved device may be controlled by relative movement of any desired device as for example a tapping fixture, transfer machine or the tool carrier of an automatic screw machine or the like.

The main body 10 is supported by the spider 12 through a plurality of legs 14 which support an adjustable clamping member 26 more clearly shown in FIG. 3. The adjustable clamp 26 engages a tap lead bushing 28 which receives the shank of a thread cutting tap 30.

The lead bushing 28 may be provided with a circumferential groove 32 having a plurality of radial holes 34 communicating through an axial bore 38 with a suitable source of fluid, air, lubricant or coolant adapted to be discharged on the tap to wash away chips and to lubricate and keep the tap cool during the thread-forming operation.

The lead bushing 28 may be secured in the adjustable clamp 26 by means of a key 36 which prevents rotation of the lead bushing within the clamp. A clamp screw 40 is provided to clamp the spaced jaws of the clamp 26 into holding engagement with the lead bushing 28. It will of course be apparent that to change to a different tap it is only necessary to release the clamp screw 40, remove the lead bushing 28 replacing it with another lead bushing having the appropriate thread corresponding with the thread on the tap 30. The lead bushing 28 is provided with a positive shoulder 41 to locate the bushing 28 with reference to the lower face of the adjustable clamp 26.

The upper end of the tap 30 is provided with a non-circular shank 42 for example of D-shaped configuration to fit within a non-circular driving sleeve 44 having a worm gear 46 formed on its outer periphery. The main drive sleeve 44 is journaled in upper and lower bearings 48 and 50 maintained in preloaded adjusted relation relative to an internal flange 54 by means of the cap 56 secured to the main body 10 by screws 58. It will be apparent that when the device is operated the tap or lead-forming member 30 is guided and projected axially by the lead bushing 28 to positively start the thread so that the first threads formed are good threads.

The worm gear 46 which drives the sleeve 44 and tap 30 is driven by a worm 60 meshing therewith and carried by a main driving shaft 62 having a large central gear 64 slidably mounted thereon and retained against rotation by means of a key 66. The large gear 64 is carried by the shaft 62 between spaced bushings 68 and 70 mounted in the main body 10 and in a cap 72 respectively. It will be noted that the worm 60 is mounted in abutting relation with a shoulder 74 in the shaft 62, and that a spacer 76 is interposed between the worm 60 and a two-way thrust bearing 78 having ball bearings 80 maintained in suitable preloaded condition by a lock nut assembly 82 threaded on the end of the shaft 62. It will be noted that the spacer 84 is employed to hold the center plate of the two-way thrust bearing 78 into engaging relation with a shoulder 86 in the bore of the assembly, the spacer 84 being held in tight engagement by means of a cap plug 88 threaded in the end of the bore.

As shown in FIGS. 1 and 2 idler gears 90 and 92 are rotatably mounted on stub shafts 94 and 96 which are a press fit in bores in the main body 10, and the cap 72 respectively. Suitable bushings 98 and 100, each bushing preferably being formed of spaced sections, are interposed between the idler gears 90 and 92 and their associated stub shafts 94 and 96 respectively, to permit free rotation of the idler gears 90 and 92.

Fluid flow ports 102 and 104 are positioned in the cavities which receive the idler gears 90 and 92 spaced somewhat from the cavity which receives the main gear 64 to prevent fluid from flowing into the cavity which receives the main gear. Two other spaced fluid flow ports 106 and 108 are correspondingly located diametrically on opposite sides of the main gear 64.

The circumferential distance from the edges of the ports 102 and 106 around the circumference of the idler gear 90 is the same as the distance between the port 104 and the port 108 around the idler gear 92. This distance is the same as the distance around the circumference of the main gear 64 between the ports 102 and 108, and the same as the circumferential distance around the main gear 64 between the ports 104 and 106. Attention is directed to the fact that by having the circumferential sealed area or path on the sides of the large gear equal to the circumferential seal area or path of the idler gears a substantially balanced hydraulic system is provided. Expressed another way it will be apparent that the outer circumferential distances 110 and 112 of the large gear 64 are equal to the circumferential distances 114 and 116 of the idler gears 90 and 92.

It will be noted that the passages 102 and 104 illustrated in FIG. 1 communicate with the manifold 118 formed in the cap member 72, as illustrated in FIGS. 2 and 3. In like manner the ports 106 and 108 communicate with a manifold 120 also formed in the cap 72.

The manifold 118 is connected through a pipe 122 with a port 124 of a valve structure 126 illustrated in FIG. 4. In like manner the manifold 120 is connected through a pipe 128 with a port 130 formed in the valve structure 126. As shown in FIG. 3 the manifold 118 terminates in a threaded boss 132 to which the pipe 122 is secured. In like manner the manifold 122 terminates in a threaded boss 134 to which the pipe 128 is secured.

The valve structure 126 has a valve body 136 having a cylindrical bore 138. The valve body 136 is contoured to provide a chamber 140 communicating with the cylindrical bore 138 at one end of the valve body. A fluid pressure inlet port 142 extends radially through the valve body 136 and communicates through an inlet port 146 with the cylindrical bore 138. A fluid outlet port 144 communicates with the cylindrical bore 138 at a point spaced axially from the inlet port 146. The inlet port 142 has an axially extending passageway 148 formed in the valve body 136 and terminating in a fluid pressure inlet port 150 communicating with the cylindrical bore 138 at a point spaced axially from the outlet port 144.

A fluid outlet drain port 152 is positioned in the bottom of the chamber 140 at the end of the cylindrical bore 138, a stand pipe 154 being positioned within the chamber 140 to maintain the level of oil in the valve body 136 at a desired predetermined position.

A hollow spool-type valve 156 is slidably mounted in the cylindrical bore 138. The spool valve 156 has a hollow central bore 158 and communicating ports 160 through its left end as illustrated to permit fluid to flow freely through the spool valve to subject opposite ends of the spool valve to equal pressures in the chamber 140 and at the left-hand end of the spool valve and in a chamber 162 positioned at the right-hand end of the valve 156. The spool valve 156 is maintained in a substantially centralized position within the cylindrical bore 158 by means of springs 164 and 166 engaging opposite ends of the spool valve 156 and suitably calibrated by means of a plurality of spaced shims 168 adapted to be interposed between the end of the spring 166 and a plug 170 which serves as a cap for closing the right-hand end of the cylindrical bore 138, a gasket 171 being provided between the cap 170 and the valve body 136 to provide a fluid tight connection. It will be noted that the spring 164 is housed within a boss 172 of an end cap 174 secured as by screws 176 to the valve body 136, a gasket 178 being interposed between the end cap 174 and the valve body 136 to maintain fluid-tight relationship therewith.

It will be noted that the left-hand end of the spool valve 156 has a cylindrical hole 180 adapted to receive a cam shaped actuating member 182 carried by an arm 184 clamped to a shaft 186, a key 188 being employed to secure fixed engagement of the arm relative to the shaft. The shaft 186 is journaled in the valve body 136, O-ring seals being employed to maintain a fluid-tight relation therewith.

An arm 190 secured to the shaft 186 on the outside of the valve body 136 terminates in a roller 192 adapted, when actuated as by the cam portion 194 of a cam block 196 secured in vertically adjusted position to a ram or crosshead 198 as by screws 200 to oscillate the shaft 186 and move the spool valve 156. It will be noted that the cam block 196 has another cam surface 201 extending at a different angular relation relative to the cam surface 194 of the cam block 196 to actuate the spool valve 156 when the roller 192 engages it while moving in the opposite direction relative to the block 196.

The spool valve 156 is provided with two lands 202 and 204 spaced longitudinally relative to each other to provide therebetween an annular fluid directing groove 206. Another pair of lands 208 and 210 are spaced longitudinally of the spool valve 156 to define therebetween an annular fluid directing groove 212.

It will be noted that the valve outlet port 144 communicates with the cylindrical bore 138 through an annular channel 214 whereby the outlet port 144 communicates with one or the other of the ports 124 or 130 depending on the longitudinally spaced position to which the spool valve 156 is moved within the cylindrical bore 138.

It will be noted that in the valve position shown in FIG. 4 fluid under pressure from the inlet port 142 is free to flow through the inlet port 218 into the annular groove 206 in the plunger 156 and through the annular groove 214 and out the manifold outlet port 144 whereupon no pressure is exerted in either of the pipes 122 or 128 communicating with the ports 124 and 130. It will also be apparent that when the spool valve 156 is thus in the neutral position shown in FIG. 4 fluid under pressure may flow from the inlet port 142 through the axially extending passageway 148 in the valve body 136 and passage 150 through the annular groove 212 in the spool valve 156 and out the annular channel 214 communicating with the outlet port 144.

The manifold inlet port 142 has a cut-off point 216 which cooperates with the land 202 formed in the spool valve 156 to interrupt the flow of fluid through the inlet port 218 when the spool valve 156 is shifted to the right to the forward drive position as shown in FIG. 5. With the spool valve 156 thus shifted to the right to the FIG. 5 position, as by engagement of the roller 192 carried by the arm 190 with the cam surface 194 of the cam block 196, the land 202 of the spool valve 156 is shifted to the fluid interrupting position with the cut-off point 216 of the valve body 136 whereupon the flow of fluid through the inlet port 218 is interrupted whereupon the flow of fluid from the groove 212 of the spool valve 156 to the outlet port 144 in the valve body 136 is interrupted by the land 208 of the spool valve 156 moving beyond the cut-off point 220 at the end of the annular channel 214 formed in the body section 136. Fluid under pressure from the inlet port 150 is then forced to flow through the annular groove 212 in the spool valve 156 through the port 124, pipe 122, threaded boss 132 and manifold passage 118 to the ports 102 and 104 of the driving motor formed by the large central gear 64 and the idler gears 90 and 92 to drive the main driving shaft 62 connected through the worm 60 and worm gear 46 to drive the main drive sleeve 44 to rotate the tap 30 through the driving shank 42.

The lead bushing 28 guides the tap 30 to move axially when it is rotated to form the desired thread in the member being threaded. When the top 30 has advanced into the member being threaded to a desired depth the roller 192 rolls off of the cam block 196 carried by the ram 22, down the cam surface 201.

The springs 164 and 166 return the spool valve 156 to the centralized or neutral position illustrated in FIG. 4 whereupon the fluid under pressure from the inlet port 142 merely flows through the outlet port 144. The pressure in the pipe 122 communicating with the manifold 118 is equalized with the return pipe pressure in the manifold 120 at substantially zero pressure or equally suspended at a minimum pressure when desired, whereupon the driving action through the fluid motor is interrupted and the tap remains in an inoperative position.

When the movement of the ram 22 is reversed the cam 201 engages the roller 192 and oscillates the arm 190 and the shaft 186 in the clockwise direction as viewed in FIG. 4 to move the spool valve 156 toward the left to the reverse drive position illustrated in FIG. 6.

It will be noted that as viewed in FIG. 6 the fluid pressure exerted in the ports 124 and 130 is reversed to that which resulted from the position of the spool valve 156 shown in FIG. 5. The land 210 of the spool valve 156 moves axially to fluid sealing engagement with the cut-off point 222 formed in the valve body 136 to interrupt the flow of pressurized fluid through the inlet passage 150. The annular groove 212 in the spool valve 156 then vents the port 124 connected through the pipe 122 with the manifold 118. The land 204 which cooperates with the land 202 to define the groove 206 in the spool valve 156 moves beyond the cut-off point 224 formed in the valve body 136 to interrupt the free flow of pressurized fluid from the inlet port 142 to the outlet port 144. Fluid under pressure then flows from the inlet port 142 circumferentially through the groove 206 in the spool valve 156 and out the port 130 connected through the pipe 128 with the threaded boss 134 of the manifold 120. The ports 106 and 108 as shown in FIG. 1 direct fluid under pressure from the manifold 120 to drive the fluid motor defined by the large gear 64 and the idler gears 90 and 92 in the reverse opposite direction. The main driving shaft 62 and the worm 60 are then driven in the opposite direction to turn the worm gear 46 and the main drive sleeve 44 to withdraw the tap 30 from the work being operated upon.

When the ram 22 moves upwardly to such a point that the tap 30 clears the material being treated, the roller 192 rolls off of the cam block 196, down the cam 194 as the ram 22 continues to move upwardly. The springs 164 and 166 then centralize the spool valve 156 whereupon the spool returns to the neutral position illustrated in FIG. 4 to permit the escape of pressurized fluid from the inlet port 142 through the outlet port 144, thereby venting the fluid motor and interrupting its operation and stopping the tapping or other operation being performed.

The embodiment of my invention illustrated in FIGS. 7 to 11 is similar in many respects to that illustrated in FIGS. 1 to 6.

This embodiment of my invention provides a self-contained machine which may be used singly or in multiples to perform tapping, lead-forming or other operations where rotation of one element relative to another is required. With this embodiment of my invention it is unnecessary that the machine be provided with relatively movable slides or ways because a self-contained unit is provided wherein the only element which moves relative to the work being operated upon is the tap.

In this embodiment of my invention planetary gearing is interposed between a fluid pressure operated driving motor and the tap. The assembly consisting of the driving motor and the gearing may be mounted on a vertically movable slide. For example, a fluid pressure operated driving motor consisting of the gears 64, 90 and 92 may be operably connected to drive planetary gearing connected to drive a thread or lead-forming tap-carrying spindle.

My improved device may be carried by a bracket 230 having a clamp portion 232 adapted to be tightened through a bolt 234 on a column 236.

As illustrated in FIG. 7 it will be noted that the column 236 has two flat surfaces 240 positioned substantially at right angles relative to each other to maintain predetermined accurate alignment with a center line 242 when moved vertically on the column 236. It will be noted that the bracket 230 may be moved vertically relative to a position retaining clamp 244 adapted to be clamped to the column 236 by means of a bolt 246. A work supporting table 248 adapted to receive a part to be operated upon may be slidably mounted on the column 236 and may be clamped thereto by means of a bolt 250.

When the table 248 has a part or fixture thereon such as the element 252 it may be lowered on the column 236 to permit changing of the tap and guide bushing or to permit loading and unloading as where deep holed threads are involved. The assembly may then be returned to a substantially predetermined position in any desired manner as by moving it into abutting relation with another position retaining clamp 254 clamped by a bolt 256 to the column 236. It will also be apparent that the bracket 230 has clamp jaws 258 adapted to be clamped by a bolt 260 into holding engagement with a cylindrical portion 262 of the main body. The bracket 230 by which the device is secured to the column 236 may be removed and replaced by any other suitable clamp to mount the unit as a self-contained unit or to mount it on another piece of equipment for various tapping or similar operations to be performed.

As more clearly shown in FIG. 8, it will be noted that the main driving shaft 62 driven by the fluid motor having the gears 64, 90 and 92 is provided with an extension 270 having a sun gear 272 of the spur gear type. The sun gear 272 meshes with and drives a plurality, for example three planet gears 274 rotatably mounted on axles 276 of a carrier 278 having a spindle extension 280 journaled in bearings 282 and 284 journaled in the cylindrical section 262. It will be noted that the upper bearing 282 is located in the section 262 by means of a snap ring 286 positioned in the cylindrical section 262 to support the outer race of the bearing, the inner race of the bearing being engaged by a shoulder 288 formed on the carrier 278. The inner race of the lower bearing 284 is supported by a snap ring 290. The outer race of the lower bearing 284 engaging a snap ring 292 positioned in a groove in the cylindrical section 262. It will also be noted that an oil seal 294 is carried at the bottom of the lower bearing 284, and that an O-ring seal 296 is positioned in a groove in the inner surface of the cylindrical section 262 and engages the lower bearing 284 at its outer diameter to provide a fluid-tight seal.

A boss 298 defining an oil drain is provided to establish the desired oil level in the planetary gear case. It will be understood that the boss 298 can be positioned at any desired level to maintain the oil level where desired. Where the unit is mounted in a horizontal position the boss 298 may be positioned circumferentially on the cylindrical section 262 as desired to provide the oil level at a desired height.

The planet gears 274 mesh at their outer peripheries with a ring gear 300 mounted in an enlarged cylindrical portion 302 of the cylindrical section 262 in such a manner that clearance is provided between the outer periphery of the ring gear and the inner diameter of the cylindrical portion 302. The ring gear 300 is provided with a plurality of anchoring pins 304 riveted or otherwise suitably secured in the ring gear, and having a depending portion 306 having a resilient bushing 308 formed of any suitable material having the necessary composition to provide desired yieldable characteristics, such for example as rubber, neoprene, etc. The bushings 308 are positioned in spaced apertures 310 in the cylindrical portion 302 to permit limited oscillation of the ring gear to compensate for variations of pitch line contact between the planet gears and the ring gear.

A sleeve 312 secured within the spindle extension 280 as by suitable splines 314 or by means of a key is maintained in assembled relation by means of a spring washer 316 of C-shaped configuration. The sleeve 312 receives the non-circular driving shank of D or other desired configuration 42 of a tap 30 in order to drive the tap. It will of course be apparent that the sleeve 312 may be replaced by a plurality of concentrically disposed sleeves of varying sizes to accommodate tap shanks of different diameters.

It will be noted that the lead bushing 28 carried by the adjustable clamp 26 provided at the lower end of the legs 24 may be clamped in place by a screw 40, a key 36 being employed to prevent rotation of the lead bushing 28. It will be apparent that the lead bushing 28 may be located vertically with reference to the clamp 26 by means of the flange 41. Oil or air under pressure may of course be supplied through the bore 38 and the groove 32 to lubricate that tap and to carry away chips as previously described.

In this embodiment of my invention I have provided an automatically operable device which functions upon initiation of the movement of a start control mechanism which may be manually or automatically actuated to start the fluid motor to drive the tap to form the thread or grooved lead or to perform any other desired operation which requires relative rotation between two members. The device automatically reverses at the end of the threading or other operation and returns to a neutral or shut-off position when the tool is removed from the material being threaded or tapped or otherwise operated upon.

Referring now more particularly to FIG. 10, it will be noted that the valve and the associated mechanism for programming the operation is similar to the valve mechanism illustrated in FIGS. 4 to 6 insofar as the control of fluid under pressure is concerned. The hollow spool valve 156 slidably mounted in the cylindrical bore 138 is provided with a push rod 318 secured to the spool valve 156 as by a pin 320. The push rod 318 is provided with a manually operable knob 322 secured thereto as by a pin 324 by means of which the spool valve 156 may be pushed in or shifted to the right in the cylindrical bore 138.

It will be noted that the inner end of the spool valve 156 is provided with communicating holes 160 interconnecting the hollow inner chamber 158 of the valve with a chamber 326, and that communicating ports 328 at the left-hand end of the push rod 318 interconnect the hollow interior 158 of the rod 318 with the chamber 162 at the end of the spool valve 156. The push rod 318 is slidably mounted in a gland 330 pressed or threaded or otherwise retained into an apertured threaded bushing 332 closing the outer end of the cylindrical bore 138, an O-ring 334 being provided to form a fluid-tight seal therewith.

The spool valve 156 is provided with an elongated aperture 336 to receive a vertically movable slide 338 slidably mounted in a cylindrical bore 340 formed in a bracket casting 342, and held against rotation therein by a guide screw 344 having its inner end projecting into a slot 346 formed in the lower cylindrical body 348 of the slide 338.

The lower cylindrical body 348 of the slide 338 is internally threaded to receive a lead screw 350 journaled for rotation in a bearing 352 adapted to take thrust in opposite directions. The lower end of the bracket casting 342 is closed by a suitable cover plate 354.

The lead screw 350 is provided with a spur gear 356 meshing with a spur gear 358 on the carrier 278 illustrated in FIG. 8. It will be noted that the spur gear 356 is provided with a pin 360 extending through the hub on the spur gear 356 and extending through the lead screw 350 to maintain the assembly against end thrust. A snap ring 362 positioned on the opposite side of the bearing 352 is provided to absorb thrust in the opposite direction. It will be noted that an O-ring 364 is provided to seal the upper end of the bracket casting 342 with reference to the valve body 366.

The upper end of the slide 338 is formed with threads to receive a lower locating nut 368 and an upper lock nut 370, a snap ring 372 being provided at the upper end of the slide 338 to define the maximum range of movement of the slide 338. It will of course be apparent that the slide 338 may be of any desired height, a threaded dust cap 374 threading into a detent casting 376 being provided to protect the slide 338.

The slide 338 is provided, intermediate its upper portion and its lower cylindrical body 348 with a cam portion 378 to engage the spool valve 156 at the end of the slot 336 as illustrated at 380 to centralize the spool valve 156 when the slide 338 is moved upwardly to engage the cam portion 378 with the spool valve 156.

It will be noted that a guide screw 382 threaded in the lower right-hand portion of the valve body 366 has its inner end slidably engaging a slot 384 in the spool valve 156 to prevent it from rotating. The right-hand end of the spool valve 156 is provided with a recess 386 to receive a compression spring 388 held in place by the end cap 170 to close the right-hand end of the valve body 366, a gasket 171 being employed to provide a fluid-tight seal.

An interlock pawl 390 is keyed to a shaft 392, having a bifurcated end 394 surrounding the slide 338, and having a cammed surface 396 to be engaged by the stop nut 368 adjustably mounted on the slide 338. It will be noted that a detent 398 slidably mounted in a detent casting 376 is yieldingly urged by a spring 400 to urge the interlock pawl 390 to engage an abutment 402 formed in the right-hand end of the spool valve 156.

Quick release means may be provided to rotate the shaft 392 to withdraw the interlock pawl 390 from the abutment 402 if necessary to interrupt the operation in an emergency. One desirable form of such releasing means comprises a lever 404 having an actuating portion 406 positioned adjacent the knob 322 as shown in FIG. 7.

The operation of the embodiment of my invention illustrated in FIGS. 7 to 11 is as follows. The element 252 to be operated on as by the formation of a thread or grooved lead therein or other operation requiring a rotary action of a tool member is mounted on the work table 248, or on a suitable fixture. The positions of the retaining clamps 244 and 254 are adjusted with reference to each other to permit the desired movement of the tap 30 relative to the lead bushing 28 to correspond with the desired movement of the tool 30 in the work 252 and the necessary clearance between the lower end of the tap or other cutting tool 30 and the top of the work 252. It will be apparent that the column 236 may be mounted at any desired angle or in any suitable relation to other members.

It will be recalled that with this embodiment of my invention the tapping or other lead forming operation may be extended automatically to a desired adjusted depth, the rotation of the tap or other tool being automatically reversed at the end of the desired length of travel of the tool and the device automatically shutting itself off when the tool approaches a central position wherein a desired degree of clearance is provided between the tool and the work.

To perform these operations, the knob 322 is depressed to move it to the right. This action may be performed manually or by any convenient automatically operated machine such, for example, as by means of a solenoid which may be controlled by perforated cards, tapes, etc.

Activation of the knob 322 toward the right is operable through the push rod 318 to shift the spool valve 156 toward the right to the end of its travel. The spring 388 in the chamber or recess 386 at the right-hand end of the spool valve 156 is compressed, and the interlock pawl 390 engaged behind the abutment 402 formed in the extension of the spool valve 156 to hold the valve in the right-hand position. As the pawl 390 is urged downward to the holding position by the spring 400 the shaft 392 is oscillated in the clockwise direction and the bifurcated ends 394 are moved upwardly on the slide 338.

The stop nut 368 is adjusted on the slide 338 to define the desired length of stroke and it is then locked in place by the lock nut 370. The distance between the stop nut 368 on the slide 338 and the cam surface 396 of the bifurcated ends 394 of the pawl 390 is substantially proportional to the distance the tap 30 or other tool is to move in performing the desired operation on the work 252 plus the clearance distance between the lower end of the tool and the upper surface of the work being operated upon.

The porting in the spool valve 156 illustrated in FIGURE 10 is similar to that illustrated in FIGS. 4 to 6 except that the ports 124 and 130 are positioned substantially at right angles to the inlet and outlet ports 142 and 144 respectively rather than being opposite thereto as shown in FIGS. 4 to 6.

When moved to the right-hand position corresponding with the forward drive position of FIG. 5, the land 202 on the spool valve 156 moves beyond the cut-off point 216 of the valve body to establish a small degree of overlap to interrupt the flow of fluid under pressure from the inlet port 142 to the outlet port 144. In like manner the land 208 on the spool valve 156 moves beyond the cut-off point 220 in the valve body, thereby interrupting the flow of fluid under pressure through the axially extending passageway 148 and the radially inward passage 150 to the outlet port 144. Fluid under pressure then flows through the annular groove 212 of the spool valve 156 directly into the manifold 118.

Pressurized fluid flows from the manifold 118 through the ports 102 and 104 to the fluid motor consisting of the large central gear 64 and the idler gears 90 and 92 to drive the main driving shaft 62 of the fluid motor. The shaft 62 is connected through the sun gear 272 to drive the planet gears 274 mounted on the axles 276 in the carrier 278. The planet gears 274 rotate within the stationary ring gear 300 to rotate the carrier 278 and the spindle extension 280 connected through the spline 314 to the sleeve 312 and the non-circular driving shank 42 to drive the tap or other tool 30.

The tap 30 rotates within the lead bushing 28 and is thus propelled axially and is fed into the work 252 being threaded. In view of the fact that the tap 30 is moved axially under controlled thrust by the bushing 28 a smooth start of the threads in the work 252 is assured thus providing a positive thread which does not vary in lead dimension.

In effecting the automatic control it will be noted that the spur gear 358 on the carrier 278 of the planetary gearing drives the spur gear 356 as illustrated in FIG. 10. The spur gear 358 rotates the lead screw 350 which, through the engaging threads in the lower cylindrical body 348 of the slide 338 moves the slide 338 downwardly. The inner end of the guide screw 344 slidably mounted in the slot 346 of the lower cylindrical body 348 of the slide 338 restrains the slide from rotating. When the slide 338 has thus been moved downwardly to such a point that the lower surface of the stop nut 368 engages the cam surface 396 of the bifurcated ends 394 the interlock pawl 390 is oscillated out of engaging relation with the abutment 402 of the spool valve 156.

The spring 388 shifts the spool valve 156 toward the left to a stop position, which may be provided by the engagement of the end of the valve spool 156 with the inner end of the bushing 332 threaded in the left end of the valve body. It will be apparent that during this phase of the operation the cam portion 378 carried by the slide 338 will have been moved downwardly with reference to the valve spool 156 so that the cam 378 does not engage the portion 380 of the valve spool 156.

When the spool valve 156 is shifted to the left-hand position by the spring 388 the grooves 206 and 212 of the spool valve 156 are shifted to the reverse drive position illustrated in FIG. 6 whereupon the lands 204 and 210 are moved beyond the cut-off points 224 and 222 respectively of the valve body. Communication between the inlet port 142 and the outlet port 144 is interrupted and the annular groove 206 in the valve spool 156 directs fluid under pressure from the inlet port 142 to the port 130 communictaing with the manifold 120.

Fluid from the manifold 120, is as shown in FIGS. 8 and 9 directed through the ports 106 and 108 to the driving motor, the fluid being introduced between the idler gears 90 and 92 and the large central gear 64 to drive the main driving shaft 62 in the reverse direction. The sun gear 272 carried by the shaft 62 then drives the planet gears 274 and the carrier 278 in the reverse direction to reverse the rotation of the spindle extension 280 and sleeve 312 to reverse the rotation of the shank 42 of the tap 30. The threads in the lead bushing 28 propel the tool 30 axially out of the work 252 being operated upon.

As the carrier 278 is thus driven in the reverse direction, the spur gear 358 carried thereby drives the spur gear 356 in the reverse direction to rotate the lead screw 350 to move the lower cylindrical body 348 and the slide 338 upwardly while being retained against rotation by the guide screw 344 moving in the slot 346. When the cam portion 378 of the lower cylindrical body 348 engages the portion 380 of the valve spool 156 the valve spool is cammed toward the right to the neutral or inoperative position illustrated in FIG. 10. Fluid admitted under pressure through the inlet port 142 is then vented through the outlet port 144, thereby interrupting the driving force to the fluid motor and rendering the device inoperative.

It will be noted that by adjusting the position of the stop nut 368 on the slide 338, the length of the tapping or other operation being formed on the work 252 may be varied. In this embodiment of my invention the device automatically goes through the cycling operation to form the thread, retract the tap and cut-off or render the device inoperative at the neutral position thereby providing substantially the same clearance between the lower end of the tap or other tool and the upper end of the work 252 being operated upon during each cycle of operation. No adjustment, other than the adjustment of the stop nut 368 is required.

As shown in FIG. 11, fluid pressure actuated reversing means are provided to trip the interlock pawl 390 to withdraw the pawl from the abutment 402 of the spool valve 156. Assuming that the element 348 has moved sufficiently for the cam surface 378 to clear the abutment 402 the spring 388 will shift the spool valve 156 to the left as viewed in FIG. 10 to reverse the flow of fluid under pressure to the manifolds 118 and 120 to reverse the direction of rotation of the fluid motor 62, 90 and 92 in the event that resistance is encountered of sufficient magnitude that there would be danger of injuring portions of the driving mechanism.

A pressure relief valve 410 seated in a bore 412 communicating with the forward drive manifold 118 is spring pressed in the closing direction by a spring 414. The tension of the spring 414 may be varied by actuating an adjusting screw 416 adapted to be clamped in adjusted positions by a lock nut 418. The adjusting assembly may be sealed by means of a cap 420 threaded in fluid-tight relation with reference to the valve body 366 by a gasket 422.

The bore 412 connected with the manifold 118 communicates with a chamber 424 closed at one end by a piston-type plug 426 provided with a sealing O-ring 428, the plug 426 being held in place by a snap ring 430 against a wire stop ring 432. It will be noted that a metering hole 434 provides controlled venting of the chamber 424.

The opposite end of the chamber 424 is formed with a cylinder 438 to receive a piston 436 slidably mounted therein and yieldingly urged toward the left as viewed in FIG. 11 by a spring 440. A drain port 442 is provided to vent the chamber for the cylinder 438. The piston 436 is secured to a push rod 444, the innermost position of the piston 436 in the cylinder 438 being established by a snap ring 446 carried adjacent the right-hand end of the rod 444 and engaging the outer end of a projection 448 of the valve body 366.

When moved to the right as viewed in FIG. 11 to an extended position, the push rod 444 engages a lever 448 secured by a pin 450 to the shaft 392 controlling the interlock pawl 390 as shown in FIG. 10.

Attention is directed to the fact that if an obstruction is encountered to operation of the tap or other tool 30 so that the resistance to rotation of the tap or other device being driven increases beyond a predetermined limit, the fluid pressure in the manifold 118 increases. The relief valve 410 is actuated by the increase in pressure thereby introducing fluid under pressure into the chamber 424. This fluid under pressure engages the piston 436 and shifts it to the right whereupon the push rod 444 engages the lever 448 and rotates the shaft 392 in the counterclockwise direction, thereby elevating the interlock pawl 390 out of engagement with the abutment 402 on the end of the spool valve 156.

The spring 388 then shifts the spool valve 156 to the left as previously described to reverse the operation. The tap or other tool being driven is then withdrawn from the engaging position with reference to the element 252 being operated upon, and the device is returned to the neutral position illustrated in FIG. 10, at which time the operation of the tool 30 is automatically interrupted.

It will be apparent that if desired a similar relief valve may be provided in association with the manifold 120 to accommodate an overload condition when the device is used to tap left-hand threads. Attention is directed to the fact that if the device is to be used for tapping left-hand threads a reversing valve will be employed to reverse the flow of fluid to the manifolds 118 and 120.

FIG. 12 illustrates a combination lead bushing and guide assembly for use in association with a lead or thread forming device of the general type disclosed in FIG. 8.

It will be noted a modified cutting tool 500 having a non-circular shank 42 is adapted to be drivingly engaged within the sleeve 312 for axial movement therein. The tool 500 has an upper section 502 preferably having precision ground full threads adapted to be engaged within a lead bushing 504 to control axial movement of the tool 500. The bushing 504 may be secured in a clamp 506 carried by a bracket 508 slidably mounted on the column 236 and adapted to be clamped in adjusted positions thereon by a bolt 510. The bushing 504 is provided with a keyway to receive a key 512 to secure the bushing against rotation in the bracket 508 when the clamp 506 is engaged by the bolt 514. The bushing 504 is provided with a radial bore 516 to align with a bore 518 in the bracket 508 to lubricate the full threaded upper section 502 of the tool 500.

The lower end of the tool 500 may be contoured in any appropriate manner to perform a desired material cutting or forming operation, such for example as being formed with axially extending reliefs defining a tap 520 to perform a tapping operation, or with appropriate lead, groove or rifling forming configurations.

The tap or other cutting tool is slidably mounted in a guide bushing 524 having an unthreaded aperture 526 to guide the lower end of the tool 500 radially thereby preventing it from deflecting radially to an undesired degree.

The guide bushing 524 may be secured in clamps 528 tightened radially thereon by a bolt 530. The clamps 528 may be carried by a bracket 532 adapted to be clamped in any desired vertically adjusted position on the column 236 as by a bolt 534.

The operation is as follows. The brackets 508 and 532 carried by the column 236 are adjusted vertically to position the guide bushing 524 adjacent the work 252 and to position the lead bushing 504 at an intermediate position between the driving sleeve 312 and the guide bushing 524.

The lead bushing 504 receives the upper full threaded section 502 of the tool 500 and controls the axial displacement of the tool 500 as its non-circular shank 42 is rotated by the driving sleeve 312. In view of the fact that the upper section 502 of the tool 500 has full threads engaging the threads formed in the lead bushing 504 the wear of the threads is minimized, and the tool 500 is positively propelled and repelled through the guide bushing 524 to operate upon the work 252. The guide bushing 524 being positioned closely adjacent the work 252 serves to restrain the tap 520 or other tool from shifting radially. The guide bushing 524 merely serves to maintain alignment of the tool and does not have any axial loading imposed thereon. It is therefore unnecessary for it to have threads.

The lead bushing 504 may be positioned vertically on the column 236 to align the radial bore 516 therein with the relieved or cut-away sections in the tool 500 to permit oil or other lubricating substance to wash down over the tap 520 or other tool when it is retracted to the inoperative position. It will be apparent that when the device is in operation the movement of the tool 520 into engagement with the work 252 shifts the total 500 axially in the lead bushing 504 to such a position that the full threads of the upper section 502 are engaging with the threads in the lead bushing 504. It will thus be apparent that when the tool 500 is subjected to load the upper full threaded section 502 of the tool is in threaded engagement with the lead bushing 504 to control the feed of the tool. The control of the oil or other lubricant through the bores 518 and 516 may be pressurized when the tool 500 is being driven in the lead bushing 504 to provide a film of oil between the contacting threads to float the tool on a film of oil. Wear of the threads is thus minimized.

Attention is directed to the fact that since the axial feeding of the tap 520 or other tool is controlled by the lead bushing 504, and the tool is maintained in accurate radial alignment by the guide bushing 524, it is possible to start threads in a plurality of parts or work 252 at the same angular position circumferentially of the part.

It will also be apparent that the guide bushing 524 may be carried by an extension from the bracket 508 or from the lead bushing 504 to permit the tap 520 or other tool to operate, for example, in a deep cylinder or other part where remote tapping is desired.

It will be apparent that various changes may be made without departing from the spirit of my invention as defined by the following claims.

I claim:

1. An automatic lead and thread forming device comprising a tap having a non-circular shank, a driving sleeve adapted to drivingly receive the shank of the tap for axial movement therein, a work support, a threaded lead bushing adapted to threadingly receive the tap for axial movement therein, gear means to drive the driving sleeve, a reversible fluid pressure operated motor to drive the gear means, a source of fluid pressure, valve means interposed between the source of fluid pressure and the fluid motor and having a movable plunger operable in one extreme position to drive the motor in one direction and operative in the other extreme position to drive the motor in the reverse direction and operative in an intermediate position to interrupt the drive of the fluid motor, yielding means urging the plunger toward one extreme position, an interlock pawl operative upon movement of the plunger to the extreme position against the resistance of the yielding means to hold the plunger in said position, adjustable threaded stop means controlling the release of the interlock pawl to vary the length of stroke of the tap, telescoping threaded means driven by said gear means to move said stop means in one direction to release the interlock pawl to reverse the direction of rotation of the fluid motor, and cam means carried by the telescoping threaded means and operative during movement of said stop means in the reverse direction to move the plunger to the intermediate position to interrupt the drive of the fluid motor.

2. A device for automatically performing a turning operation comprising a rotatable tool having a non-circular shank, a driving sleeve adapted to drivingly receive the shank of the tool for axial movement therein, a support for the reception of pieces of work to be operated upon, a threaded lead bushing adapted to threadingly receive the tool for axial movement therein, gear means to drive the driving sleeve, a reversible fluid pressure operated motor to rive the gear means, a source of fluid pressure, valve means interposed between the source of fluid pressure and the fluid motor and having a movable plunger operable in one extreme position to drive the motor in one direction and operative in the other extreme position to drive the motor in the reverse direction and operative in a third position to interrupt the drive of the fluid motor, yielding means urging the plunger toward one extreme position, interlock means operative upon movement of the plunger to the extreme position against the resistance of the yielding means to hold the plunger in said position, adjustable threaded abutment means controlling the release of the interlock means to vary the length of stroke of the tool, telescoping threaded means driven by said gear means to move said abutment means in one direction to released the interlock means to reverse the direction of rotation of the fluid motor, and cam means carried by the telescoping threaded means and operative during movement of said stop means in the reverse direction to move the plunger to said third position to interrupt the drive of the fluid motor.

3. The invention defined in claim 2 wherein fluid pressure responsive means are provided to release drive to the tool in the event that an overload condition is encountered.

4. In a control mechanism for a reversible fluid pressure operated motor having spaced ports to drive the motor in one direction when fluid under pressure is supplied to one port and to drive the motor in the reverse direction when fluid under pressure is supplied to another port, a source of fluid pressure, valve means interposed between the source of fluid pressure and the fluid motor and having a movable member operable in a first position to supply pressurized fluid to said one port to drive the motor in one direction and operative in a second position to supply pressurized fluid to said another port to drive the motor in the reverse direction and operative in a third position to interrupt the operation of the fluid motor, yielding means operative to urge the movable member of the valve means toward one of said positions, a pivoted member operative to hold the movable member of the valve means in another of said positions, cam means to urge the movable member of the valve means to the other of said positions, a movable threaded member having an adjustable abutment to control the pivoted member to control the position of the movable member of the valve means, and motion transmitting means interposed between a member driven by the fluid motor and said threaded member to control the adjustable abutment to release the movable member of the valve means from said another position and to control the cam means carried by the threaded member to move the movable member of the valve means to said third position.

5. The invention defined in claim 4 wherein a planetary gear train is driven by the fluid motor and the threaded member controlling the adjustable abutment and the cam is driven by the carrier of the planetary gear train.

References Cited in the file of this patent

UNITED STATES PATENTS

| 557,123 | Hall | Mar. 31, 1896 |
| 826,502 | Hanson | July 17, 1906 |
| 828,466 | Doran | Aug. 14, 1906 |
| 938,339 | Riesenweber | Oct. 26, 1909 |
| 1,816,829 | De Leeuw | Aug. 4, 1931 |
| 2,292,850 | Sundstrand | Aug. 11, 1942 |
| 2,310,124 | Shartle | Feb. 2, 1943 |
| 2,346,297 | Garbe | Apr. 11, 1944 |
| 2,501,738 | Prutton | Mar. 28, 1950 |
| 2,550,148 | Harding | Apr. 24, 1951 |
| 2,552,840 | Burke | May 15, 1951 |
| 2,620,777 | Towler | Dec. 9, 1952 |
| 2,696,196 | Adams | Dec. 7, 1954 |
| 2,702,995 | Biedess | Mar. 1, 1955 |
| 2,715,233 | Clark | Aug. 16, 1955 |
| 2,830,310 | Smith | Apr. 15, 1958 |
| 2,893,268 | Liebel | July 7, 1959 |

FOREIGN PATENTS

| 382,022 | Germany | Sept. 27, 1923 |
| 1,072,756 | France | Mar. 17, 1954 |